(12) United States Patent
Johnson

(10) Patent No.: US 7,177,499 B2
(45) Date of Patent: Feb. 13, 2007

(54) ATHERMAL PACKAGE FOR FIBER BRAGG GRATINGS WITH COMPENSATION FOR NON-LINEAR THERMAL RESPONSE

(75) Inventor: Alan E. Johnson, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 198 days.

(21) Appl. No.: 10/402,581

(22) Filed: Mar. 28, 2003

(65) Prior Publication Data
US 2004/0190827 A1    Sep. 30, 2004

(51) Int. Cl.
G02B 6/34    (2006.01)
(52) U.S. Cl. .......................................... 385/37; 385/14
(58) Field of Classification Search ................... 385/31, 385/37, 42, 14
See application file for complete search history.

(56) References Cited

U.S. PATENT DOCUMENTS

| | | | |
|---|---|---|---|
| 5,042,898 | A | 8/1991 | Morey et al. |
| 6,101,301 | A | 8/2000 | Engelberth et al. |
| 6,233,382 | B1 | 5/2001 | Olson et al. |
| 6,377,727 | B1 | 4/2002 | Dariotis et al. |
| 6,453,108 | B1 | 9/2002 | Sirkis |
| 6,621,957 | B1 * | 9/2003 | Sullivan et al. ............... 385/37 |
| 6,771,858 | B2 * | 8/2004 | Bourcier et al. .............. 385/37 |
| 2002/0141701 | A1 | 10/2002 | Boitel et al. |

FOREIGN PATENT DOCUMENTS

WO    WO 01/67142    9/2001
WO    PCT/US2004/003416    7/2004

OTHER PUBLICATIONS

PCT/US2004/003416 (filed Dec. 5, 2004), PCT International Preliminary Report on Patentability, Oct. 1, 2005.

* cited by examiner

*Primary Examiner*—Kevin S. Wood
(74) *Attorney, Agent, or Firm*—Blakely, Sokoloff, Taylor & Zafman LLP

(57) ABSTRACT

An athermal package for fiber photonic devices includes three portions of at least three materials, each having a coefficient of thermal expansion that is different from the other two. In contrast, a conventional athermal packages typically has only two materials. In a typical application, an optical fiber containing a photonic device is attached to the athermal package. The three materials of the athermal package are selected and the three portions as sized to optimize a thermal response of the package to that of the optical fiber.

14 Claims, 5 Drawing Sheets

US 7,177,499 B2

ATHERMAL PACKAGE FOR FIBER BRAGG GRATINGS WITH COMPENSATION FOR NON-LINEAR THERMAL RESPONSE

FIELD OF THE INVENTION

Embodiments of invention relate generally to fiber photonic devices and, more specifically but not exclusively relate to packages for fiber photonic devices.

BACKGROUND INFORMATION

An optical transmission system transmits information from one place to another by way of a carrier whose frequency is in the visible or near-infrared region of the electromagnetic spectrum. A carrier with such a high frequency is sometimes referred to as an optical signal, an optical carrier, or a lightwave signal. Such optical signals are commonly propagated in optical fibers.

In some systems, photonic devices are built into or include a segment of optical fiber. For example, a Bragg grating can be implemented in a segment of optical fiber by forming regions of periodically alternating refractive indices in the fiber segment through which an optical signal is propagated. This type of Bragg grating is commonly referred to as a fiber Bragg grating (FBG) and is typically used as a wavelength selective filter in fiber optic communication systems. For example, the FBG can be used to filter out a particular wavelength (known as the Bragg wavelength). The Bragg wavelength depends on the average or effective refractive index of the optical fiber segment and on distance between gratings of the alternating regions (i.e., the period). As is well known, the Bragg wavelength of a FBG is dependent on the temperature and the strain on the fiber segment containing the FBG.

Typically, the optical fiber segment containing the FBG is attached under strain to a package that can be mounted on a board or otherwise incorporated into a unit or assembly. As schematically illustrated in FIG. 1 (PRIOR ART), the optical fiber segment is attached to a conventional package at two attachment points, with the FBG section being between the attachment points.

However, the size of the package can be sensitive to temperature. For example, the package can expand when the temperature changes, which in turn can change the strain applied to the optical fiber segment containing the FBG. This temperature dependent strain induced by the package can be used to augment or compensate the intrinsic temperature sensitivity of the FBG. Packages wherein an increase in temperature leads to a decrease in strain can have a reduced temperature sensitivity of the Bragg wavelength. Such packages are commonly referred to as athermal packages.

One conventional athermal package is schematically illustrated in FIG. 1 (Prior Art). As shown, an optical fiber 100 containing a FBG region 101 is attached to a package. The package has portions 102 and 103 that are made of one material and a portion 106 made of another material. Optical fiber 100 is attached under strain to portions 102 and 103 using bonds 104 and 105, with FBG region 101 being between the bonds. Bonds 104 and 105 are commonly solder, epoxy or other adhesive. Generally, such conventional solutions select the materials of portions 102, 103 and 106 so that when a temperature change occurs that causes portion 106 to expand (i.e., increasing the strain on the segment of optical fiber 100 between bonds 104 and 105), portions 102 and 103 expand so as to reduce the strain on the segment of optical fiber 100 between bonds 104 and 105. Ideally, the expansion of portions 102 and 103 exactly counteract the increase in strain caused by expansion of the portion 106 and the inherent temperature dependence of the FBG. Precise control of the dimensions of the package and the length of the optical fiber between bonds 104 and 105 are needed to achieve the desired temperature compensation of the package. However, over large temperature ranges, non-linear thermal dependencies can detrimentally affect the performance of such conventional packages because the designs are based on assuming of a linear temperature dependence of the package and fiber containing the FBG.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Embodiments of the present invention are directed to an athermal package formed from three (or more) materials each having a different coefficient of thermal expansion (also referred to herein as thermal expansion coefficient). Note that we herein refer to the overall thermally induced dimensional change of a material as a thermal expansion coefficient even for materials that show a very nonlinear thermal response. The optical fiber segment can include or contain a photonic device such as, for example, a FBG.

In one embodiment, the package includes a base portion and two fiber attachment portions, each being formed from a different material. For example, in one implementation, the materials are a Nickel-Iron alloy (e.g., Invar 36®), Bronze (e.g., type 937 bronze) and stainless steel (e.g. type 303 stainless steel).

Although the following detailed description is directed to a FBG embodiment with two bonding regions at each end of an optical fiber segment, other embodiments can include other types of photonic devices and/or more than two bonding regions.

Figure 1:
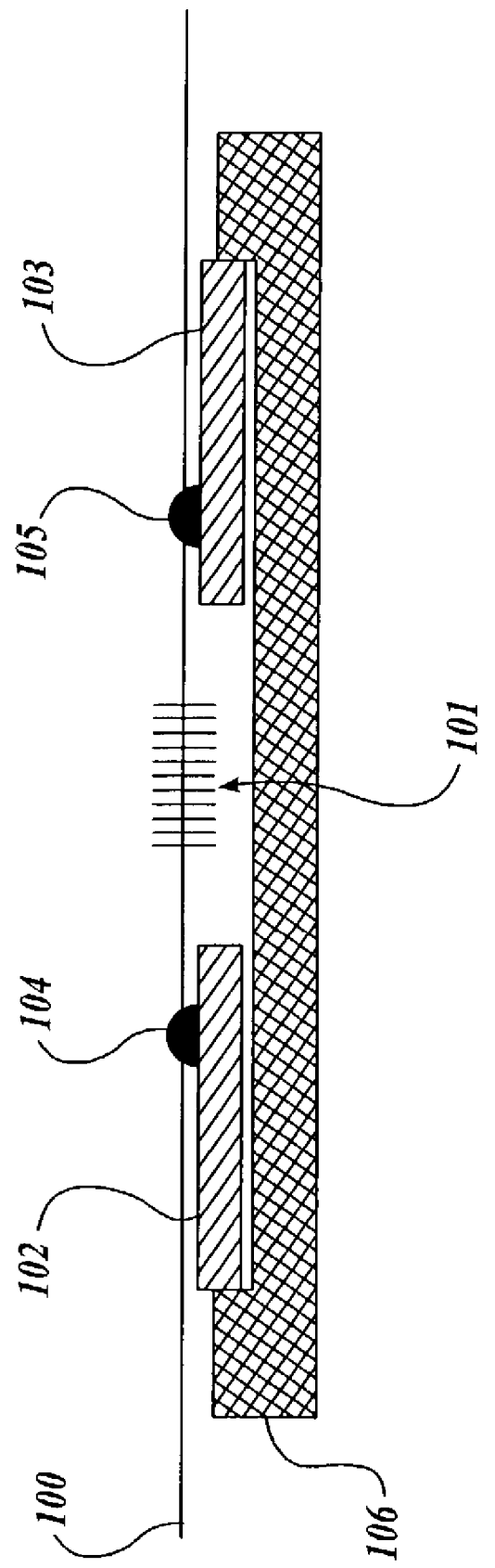
FIG. 1 (Prior Art) is a schematic diagram illustrating a conventional athermal package for a FBG.
Figure 2:
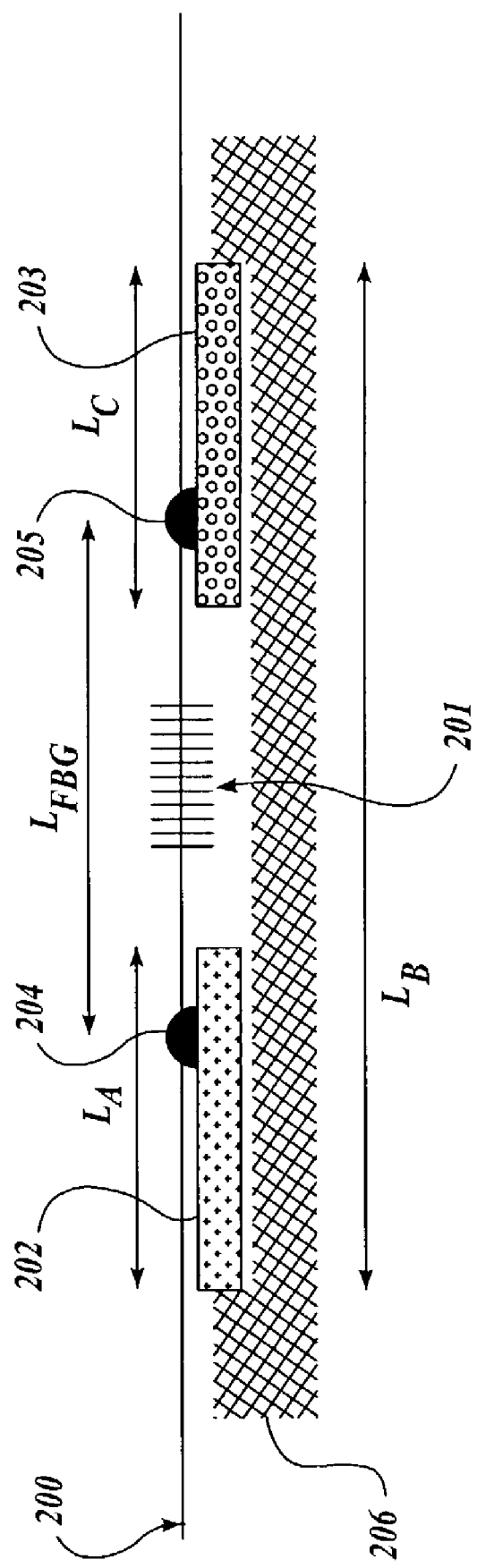
FIG. 2 is a schematic diagram illustrating an athermal package with three thermally responsive materials, according to one embodiment of the present invention.

FIG. 2 schematically illustrates an athermal package for use with optical fiber 200 containing a FBG region 201, according to one embodiment of the present invention. In this embodiment, the athermal package includes fiber attachment portions 202 and 203 and base portion 206 that are similar to portions 102, 103 and 106 (FIG. 1) of a conventional athermal package. In this embodiment, portions 202, 203 and 206 are each made of material that is different from the other two portions. Portions 202 and 203 are referred to herein as attachment portions because optical fiber 200 is attached to the athermal package to these portions using bonds (described below).

The elements of this embodiment of the athermal package are interconnected as follows. Attachment portion 202 has one end that is attached at or near one end of base portion 206 (ie., an end of base portion 206 taken along the propagation axis of optical fiber 200). Similarly, attachment portion 203 has an end that is attached to the other end of base portion 206. As shown in FIG. 2, the distance between the points where attachment portions 202 and 203 are attached to base portion 206 is indicated as $L_B$. In this embodiment, optical fiber 200 is attached to attachment portion 202 via a bond 204 and to attachment portion 203 via a bond 205. Bonds 204 and 205 are described below in more detail.

In one embodiment, base portion 206 includes a groove or trench, with attachment portions 202 and 203 being attached to base portion 206 at the interior sidewalls at each end of the trench. For example, attachment portions 202 and 203 may be pins that can be fitted into holes formed in interior sidewalls at the ends of the trench. In a further refinement, the ends of these pins are threaded so that attachment portions 202 and 203 can be screwed into the interior end sidewalls of the trench formed in base portion 206. In other embodiments, base portion 206 is formed as a tube or cylinder that is closed at each end. Attachment portions 202 and 203 can be hollow tubes attached to "tube-shaped" base portion 206 as in the previous example, with optical fiber 200 disposed within the hollow portions of attachment portions 202 and 203. Portions 202, 203 and 206 can have other shapes in other embodiments.

Bond 204 is formed on or in attachment portion 202 and is used to attach a point of optical fiber 200 to attachment portion 202. In one embodiment, bond 204 is formed of an adhesive such as epoxy, solder, glass solder or other appropriate bonding material known in the art, with optical fiber 200 being embedded in or running through the adhesive. Other suitable adhesives and mechanical bonding techniques can be used to form bond 204 in other embodiments. In a further refinement, attachment portion 202 may also include depressions or holes to receive the adhesive. Bond 205 is formed on or in attachment portion 203 in a manner similar to that described above for forming bond 204 on attachment portion 202.

In addition, optical fiber 200 is loaded when attached to athermal package 200. In one exemplary embodiment, optical fiber 200 is loaded to experience a strain of about 800–1000 microstrains when the temperature is at the lowest end of the expected or specified operating temperature.

As indicated in FIG. 2, the length of the segment of optical fiber 200 between bond 204 and bond 205 (containing FBG region 201) is indicated as $L_{FBG}$. Although in this embodiment each attachment portion has only one bond, more than one bond may be used in other embodiments. Base portion 206 has an operational length of $L_B$. Attachment portion 202 has an operational length (defined as the distance from the contact point to base portion 206 to bond 204 taken along the propagation axis of optical fiber 200) of $L_A$. Similarly, attachment portion 203 has an operational length (defined as the distance from the contact point to base portion 206 to bond 205 taken along the propagation axis of optical fiber 200) of $L_C$. The term propagation axis is used in this context to refer to the longitudinal axis of optical fiber 200 when attached to the athermal package.

In operation, as the temperature changes, the values of $L_B$, $L_A$ and $L_C$ will change according to the thermal coefficient of expansion of materials of portions 202, 203 and 206. The materials of portions 202, 203 and 206, the initial loading of optical fiber 200 and the initial values of $L_{FBG}$, $L_B$, $L_A$ and $L_C$ are all selected to achieve a desired thermal response so as to compensate or counteract the temperature dependent changes in the performance of the FBG. In one embodiment, base portion 206 is formed from Invar 36®, attachment portion 202 is formed from bronze 937 and attachment portion 203 is formed from stainless steel 303. In other embodiments, different materials and different dimensions/sizes may be used to implement portions 202, 203 and 206.

The three selected materials (and the selected dimensions/sizes) used in portions 202, 203 and 206 produces a more balanced temperature response over the temperature range of interest compared to conventional athermal packages that use only one or two materials. See, for example, FIG. 4 that illustrates the thermal response of one embodiment of the athermal package having three materials (i.e., Invar/bronze/stainless steel), along with those of two conventional athermal packages for comparison.

Figure 3:
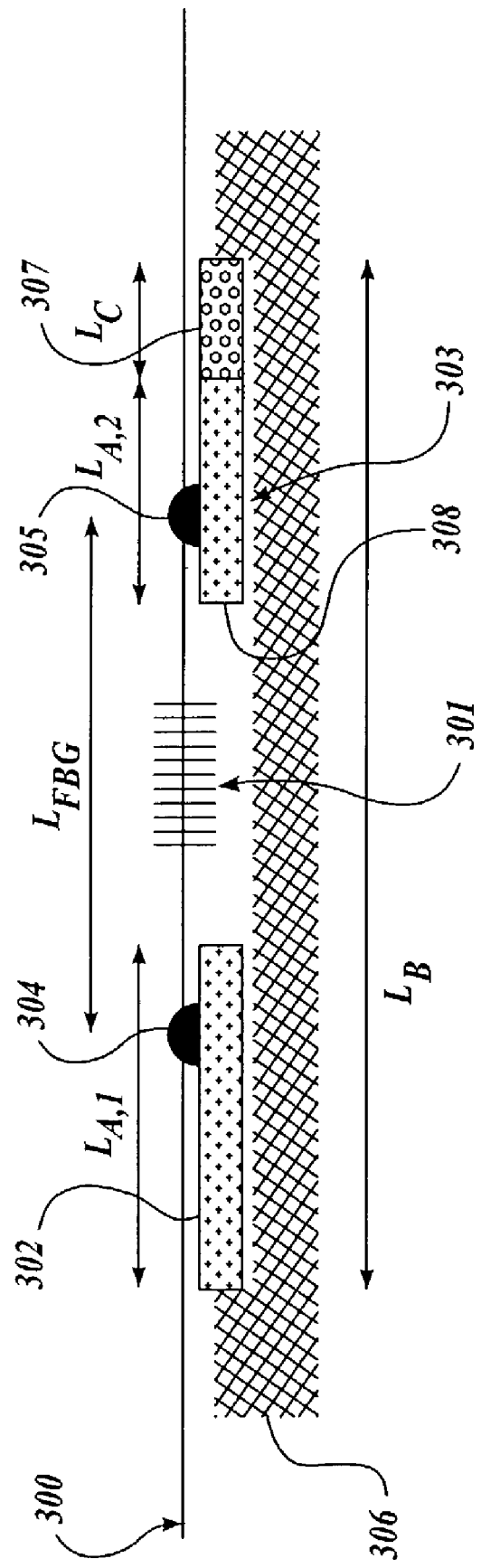
FIG. 3 is a schematic diagram illustrating an athermal package with three thermally responsive materials, according to a second embodiment of the present invention.

FIG. 3 schematically illustrates an athermal package for use with optical fiber 300 containing a FBG region 301, according to a second embodiment of the present invention. In this embodiment, the athermal package includes fiber attachment portions 302 and 303 and base portion 306 that are similar to portions 202, 203 and 206 (FIG. 2).

In this embodiment, attachment portion 302 and base portion 306 are made of materials that are different from the other portion, while attachment portion 303 is formed from two materials, where at least one of the materials is different from the materials of portions 302 and 306. More particularly, in this embodiment, attachment portion 303 is formed from two segments, namely, a segment 307 and a segment 308. In this embodiment, segment 308 is formed from the same material as attachment portion 302, whereas segment 307 is formed from a material that is different from the materials of both segment 308 and base portion 306. In one embodiment, base portion 306 if made from Invar 36®, attachment portion 302 is formed from stainless steel (e.g., type 303 stainless steel), section 307 is formed from bronze 937 and section 308 is formed from stainless steel. Sections 307 and 308 of attachment portion 303 are attached to each other using any suitable technique. For example, in one embodiment the sections are brazed/soldered/welded together. In other embodiments, one section can include a threaded post that can be screwed into a threaded hole in the other section. In still other embodiments, a suitable adhesive may be used to attach the sections to each other.

The elements of this embodiment of the athermal package of FIG. 3 are interconnected as follows. Attachment portion 302 has one end that is attached at or near one end of base portion 306 in a manner similar to that described above for attachment portion 202 (FIG. 2). Similarly, attachment portion 303 has an end that is attached to the other end of base portion 306. In this embodiment, section 307 of attachment portion 303 is attached to base portion 306. In this embodiment, optical fiber 300 is attached to attachment portion 302 via a bond 304 and to attachment portion 303 via a bond 305 (located on section 308 of attachment portion 303). In other embodiments, different combinations, arrangements, sizes of the materials, portions and sections may be used.

In this embodiment, the operational length of attachment portion 302 is indicated as $L_{A,1}$ in FIG. 3. The operational length of section 307 of attachment portion 303 is indicated as $L_C$, and the operational length of section 308 of attachment portion 303 is indicated as $L_{A,2}$. The operational lengths of base portion 306 and FBG portion 301 are indicated as $L_B$ and $L_{FBG}$ in FIG. 3. In one embodiment, $L_{FBG}$ is about 45 mm, $L_B$ (Invar 36®) is about 73 mm, $L_{A,1}$ and $L_{A,2}$ (stainless steel) are about 25.75 mm, and $L_C$ (bronze) is about 2.25 mm. As previously mentioned, other embodiments may have different dimensions for the operational lengths that are suitable or optimized for a particular application. For example, conventional simulation/modeling tools or techniques can be used to optimize the dimensions for a particular combination of materials and/or arrangement of the portions.

Figure 4:
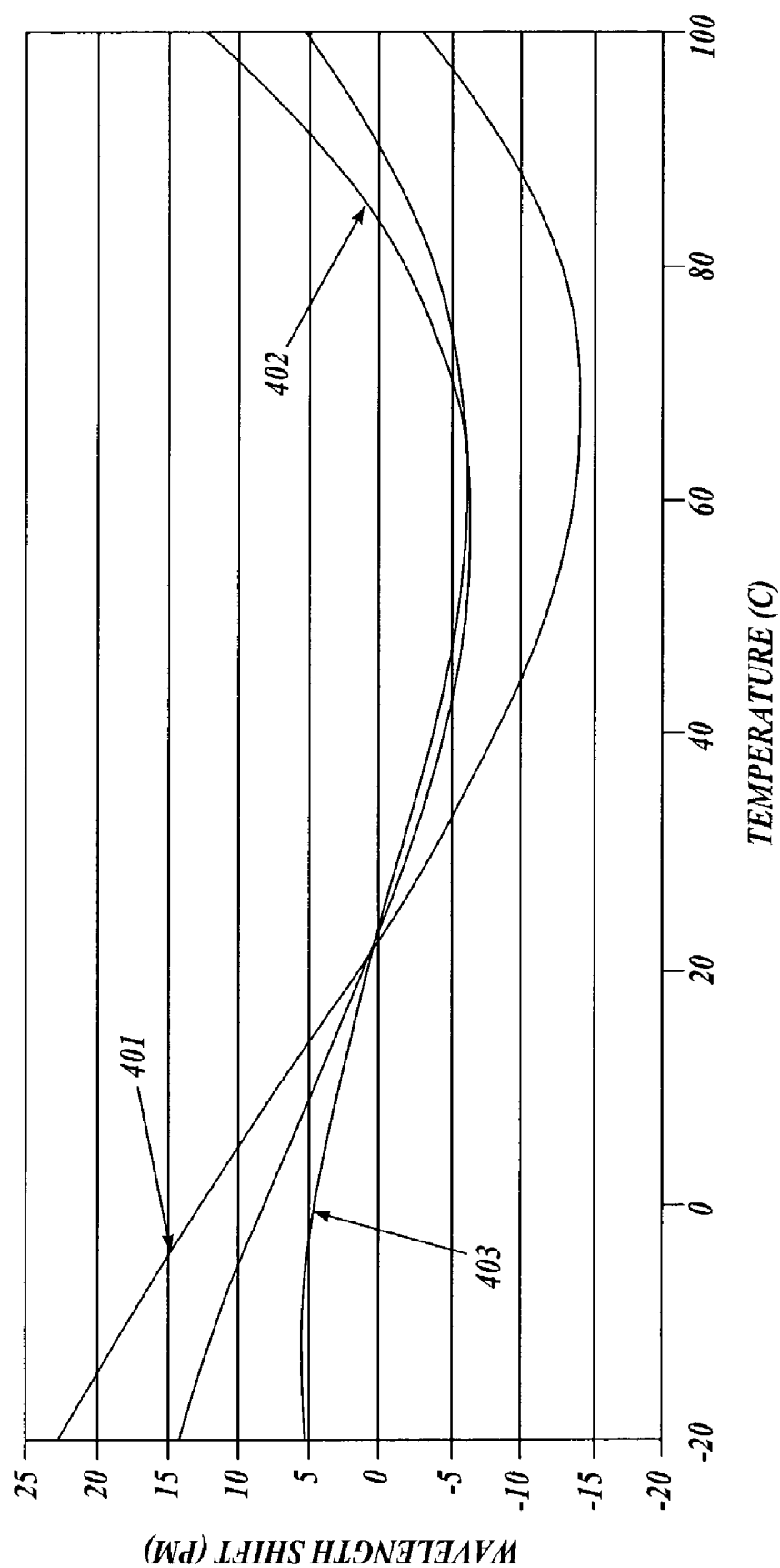
FIG. 4 is a diagram illustrating the temperature response of an athermal package with three materials according to one embodiment of the present invention, with temperature responses of conventional athermal packages for comparison.

In FIG. 4, the thermal response of the Invar®/bronze/stainless steel athermal package of FIG. 3 is represented by a curve 403. In particular, curve 403 represents the wavelength shift in pico-meters (pm) from the center wavelength of the FBG attached to the Invar/bronze/stainless steel athermal package, over a temperature range of –20° C. to 100° C. The thermal response of a conventional athermal package using linearly optimized Invar® base portion and bronze attachment portions is represented by a curve 401. The thermal response of a conventional athermal package using nonlinearly optimized Invar base portion and bronze attachment portions is represented by a curve 402.

As can be seen from curve 403, the deviation for the Invar®/bronze/stainless steel athermal package is about 12 pm (i.e., ranging from about 5 pm to about –7 pm). In contrast, the deviation for the conventional athermal packages having only Invar® and bronze are about 37 pm (curve 401) and about 21 pm (curve 402). Thus, the athermal package of FIG. 3 is significantly more stable over the temperature range of interest compared to the conventional athermal packages.

Figure 5:
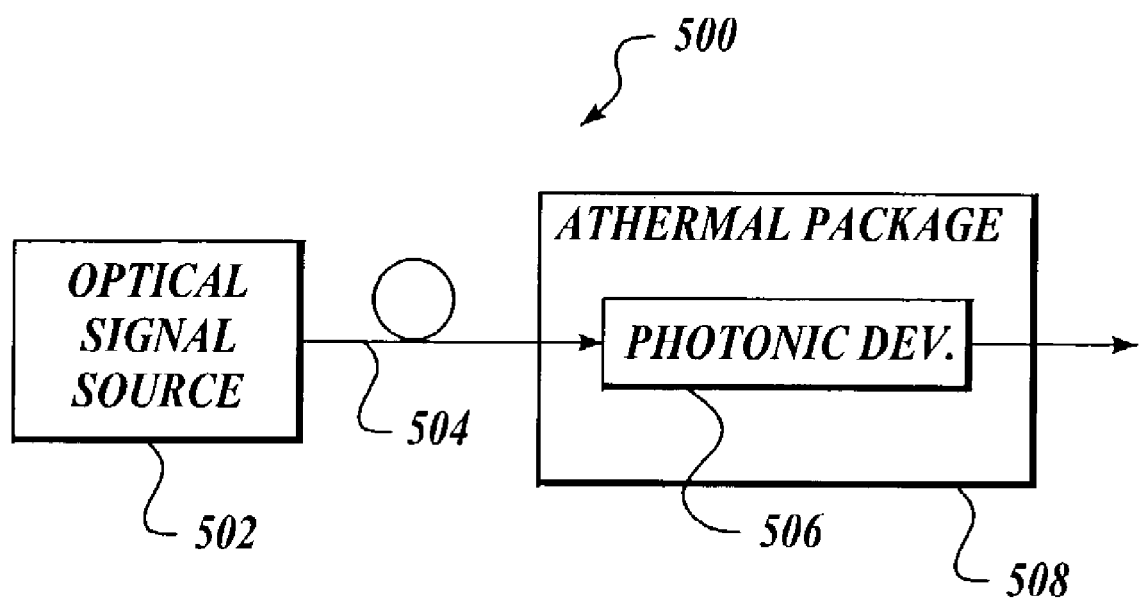
FIG. 5 is a block diagram of an optical system using an athermal package according to an embodiment of the present invention.

FIG. 5 is included to illustrate an exemplary optical system 500 that can use an athermal package according to an embodiment of the present invention. In this embodiment, optical system 500 includes an optical signal source 502, an optical fiber 504, a photonic device 506 coupled to one end of optical fiber 504, and an athermal package 508 attached to photonic device 506. Photonic device 506 can also be coupled to one or more other elements (not shown) of optical system 500.

Optical system 500, in this embodiment, is a wavelength division multiplexed (WDM) system and photonic device 506 is a fiber Bragg grating. In one embodiment, photonic device 506 is implemented in a section of optical fiber 504. In other embodiments, photonic device 506 can be spliced onto an end of optical fiber 504. In two embodiments, athermal package 508 is substantially similar to the embodiments described above in conjunction with FIGS. 2 and 3.

In operation, optical signal source 502 can provide an optical signal to photonic device 506 via optical fiber 504. Photonic device 506 operates on the optical signal (e.g., filters out a wavelength component of the optical signal) and provides the operated signal to one or more other elements of system 500 as in known WDM systems. As previously described, athermal package 508 can be more easily/accurately fabricated with the desired temperature compensation and high reliability, compared to conventional athermal packages.

Embodiments of method and apparatus for an athermal package for photonic devices are described herein. In the above description, numerous specific details are set forth (such as the sizes, shapes and materials of various portions of the athermal package) to provide a thorough understanding of embodiments of the invention. One of ordinary skill in the relevant art will recognize, however, that embodiments of the invention can be practiced without one or more of the specific details, or with other methods, components, materials, etc. In other instances, well-known structures, materials, or operations are not shown or described in detail to avoid obscuring the description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The above description of illustrated embodiments of the invention, including what is described in the Abstract, is not intended to be exhaustive or to be limitation to the precise forms disclosed. While specific embodiments of, and examples for, the invention are described herein for illustrative purposes, various equivalent modifications are possible, as those skilled in the relevant art will recognize.

These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An apparatus, comprising:
a package attachable to a signal propagation medium that includes a device to affect a characteristic of a signal propagated in the signal propagation medium, the device disposed between first and second points on the signal propagation medium, the package having:
a first portion formed from a first passive material and coupled to the signal propagation medium at the first point;
a second portion, coupled to the first portion, formed from a second material; and
a third portion, coupled to the second portion and the signal propagation medium at the second point, having a first section formed from a third passive material and having a second section formed from a fourth passive material, wherein each of the materials are selected to at least partially compensate for a temperature change, wherein each of the first passive material, the second material, and the third passive material have thermal responses different from the other two materials, wherein the first and third portions apply a tensile strain to the signal propagation medium at the first and second points, respectively.

2. The apparatus of claim 1 wherein the signal propagation medium is an optical fiber.

3. The apparatus of claim 2 wherein the fourth passive material is selected from the group consisting of the first passive material and the second material.

4. The apparatus of claim 2 wherein the device comprises a fiber Bragg grating (FBG).

5. The apparatus of claim 2 further the first passive material, the second material, and the third passive material are selected from the group consisting of NiFe alloy, bronze, and stainless steel.

6. A system, comprising:
an optical signal source;

an optical fiber coupled to the optical signal source; and a photonic device coupled to the optical fiber, wherein the photonic device is disposed between first and second points of a segment of optical fiber, the photonic device including a package attached to the optical fiber segment between the first and second points, the package having:

a first portion formed from a first passive material and coupled to the optical fiber at the first point;

a second portion, coupled to the first portion, formed from a second material; and a third portion, coupled to the second portion and to the optical fiber at the second point, having a first section formed from a third passive material and having a second section formed from a fourth passive material, each of the materials selected to at least partially compensate for a temperature change and wherein each of the first passive material, the second material, and the third passive material have thermal responses different from the other two materials, wherein the first and third portions apply a tensile strain to the optical fiber at the first and second points, respectively.

7. The system of claim 6 wherein the fourth passive material is selected from the group consisting of the first passive material and the second material.

8. The system of claim 6 wherein the photonic device comprises a fiber Bragg grating (FBG) formed in the optical fiber.

9. The system of claim 6 wherein the first passive material, the second material, and the third passive material are selected from the group consisting of NiFe alloy, bronze, and stainless steel.

10. A method comprising:

forming a first portion of an athermal package from a first passive material having a first coefficient of thermal expansion;

forming a second portion of the package from a second material having a second coefficient of thermal expansion;

forming a third portion of the package having a first section and a second section, the first section of the third portion being formed from a third passive material having a third coefficient of thermal expansion, the second section formed from a fourth passive material, wherein substantially each of the materials are selected to compensate for a thermal difference, the first and third portions being connected to the second portion, wherein the first, second and third coefficients of thermal expansion are different from each other; and attaching a first point on a signal propagation medium to the first portion and attaching a second point on the signal propagation medium to the third portion, wherein the first and third portions apply a tensile strain to the signal propagation medium at the first and second points, respectively, wherein the signal propagation medium includes a device that affects a characteristic of a signal propagating in the signal propagation medium between the first and second points.

11. The method of claim 10 wherein the material of the second section of the third portion is selected from a group consisting of the first passive material and the second material.

12. The method of claim 10 wherein the first passive material, the second material, and the third passive material are selected from the group consisting of NiFe alloy, bronze, and stainless steel.

13. The method of claim 10 wherein the signal propagation medium is an optical fiber.

14. The method of claim 13 wherein the device comprises a fiber Bragg grating (FBG).

* * * * *